INVENTOR.
LAWRENCE A. VOGL
BY
Christopher L. Waal
ATTORNEY

Feb. 25, 1964  L. A. VOGL  3,122,682
LIMIT SWITCH APPARATUS
Filed Dec. 16, 1958  3 Sheets-Sheet 2

INVENTOR.
LAWRENCE A. VOGL
BY Christopher L. Waal
ATTORNEY

Feb. 25, 1964 L. A. VOGL 3,122,682
LIMIT SWITCH APPARATUS
Filed Dec. 16, 1958 3 Sheets-Sheet 3
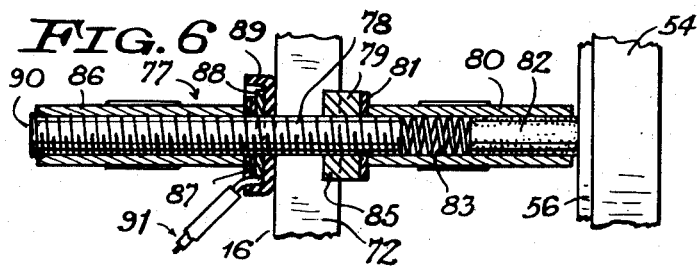
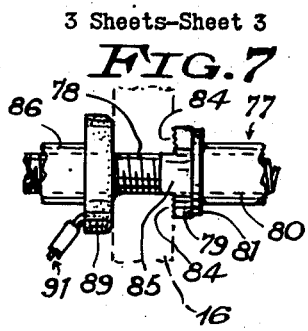
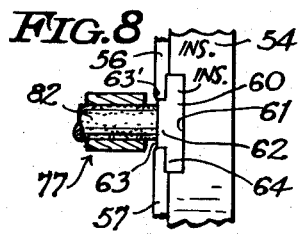
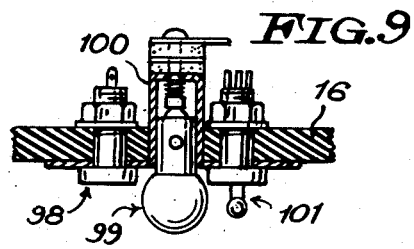
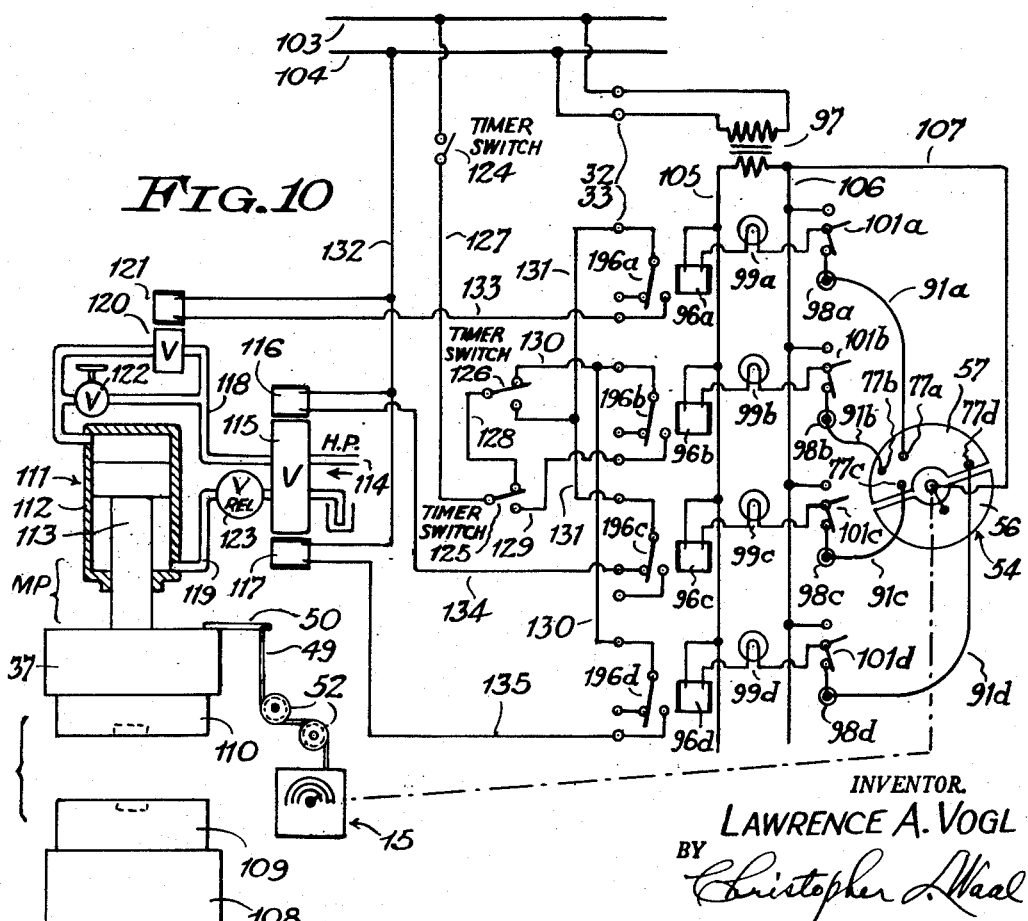
INVENTOR.
LAWRENCE A. VOGL
BY Christopher L. Waal
ATTORNEY United States Patent Office 3,122,682
Patented Feb. 25, 1964

3,122,682
LIMIT SWITCH APPARATUS
Lawrence A. Vogl, 711 Emerson Ave.,
South Milwaukee, Wis.
Filed Dec. 16, 1958, Ser. No. 780,761
4 Claims. (Cl. 317—137)

This invention relates to electrical controlling means and more particularly to limit switch apparatus and systems for use in the control of machinery having a movable operating member, such as a reciprocating die-carrying platen of a hydraulically operated plastic molding press, or a reciprocating or rotating carriage of a machine tool.

In a well known form of plastic molding machine or press, such as of the compression type, a pair of relatively movable heated dies forming a die cavity between them are brought together and separated by a hydraulic cylinder or ram the piston of which is secured to a reciprocatory platen carrying one of the dies. Thermosetting molding material is deposited in the press while the press is open, and sets in the dies under pressure when the press is closed. During the molding cycle, the pressure may be relieved one or more times to permit escape of gases, this being known as breathing or degassing and being effected by slightly separating the dies. Thereafter, the press is reclosed for a predetermined time to shape and cure the molded article under pressure, following which the press is opened and the article is removed. The duration of the various steps in the molding cycle will differ depending on the type of molding material, the shape and volume of the article, the density required, and other considerations. The press operation is usually controlled by suitable cycle timing means cooperating with limit switch means responsive to the position of the reciprocating die-carrying platen.

An object of the invention is to provide an improved limit switch apparatus of simple, reliable and compact construction adapted for use in controlling the operation of a plastic molding press or other machine.

Another object is to provide a limit switch apparatus which will permit a plurality of independent operating adjustments to be conveniently and accurately made at one station, and which requires only a single, simple actuating or driving connection to the movable member of the machine.

Still another object is to provide a limit switch apparatus which is easily installed, safe in operation, and flexible in application.

A further object is to provide a limit switch apparatus which will facilitate the setting up of the machine cycle and testing of the operation of the machine.

The invention further consists in the several features hereinafter described and claimed.

In the accompanying drawings,

FIG. 6 is an enlarged detail sectional view showing a panel-mounted brush-carrying contactor, taken generally on the line 6—6 of FIG. 3;

FIG. 7 is an enlarged fragmentary side view of the contactor;

FIG. 8 is an enlarged fragmentary detail side view of the contact disk and cooperating brush;

FIG. 9 is a detail sectional view of a jack and switch assembly, taken generally on the line 9—9 of FIG. 1, and FIG. 10 is a diagrammatic view including circuit connections, showing an application of the limit switch apparatus to a plastic molding press.

Figure 1:
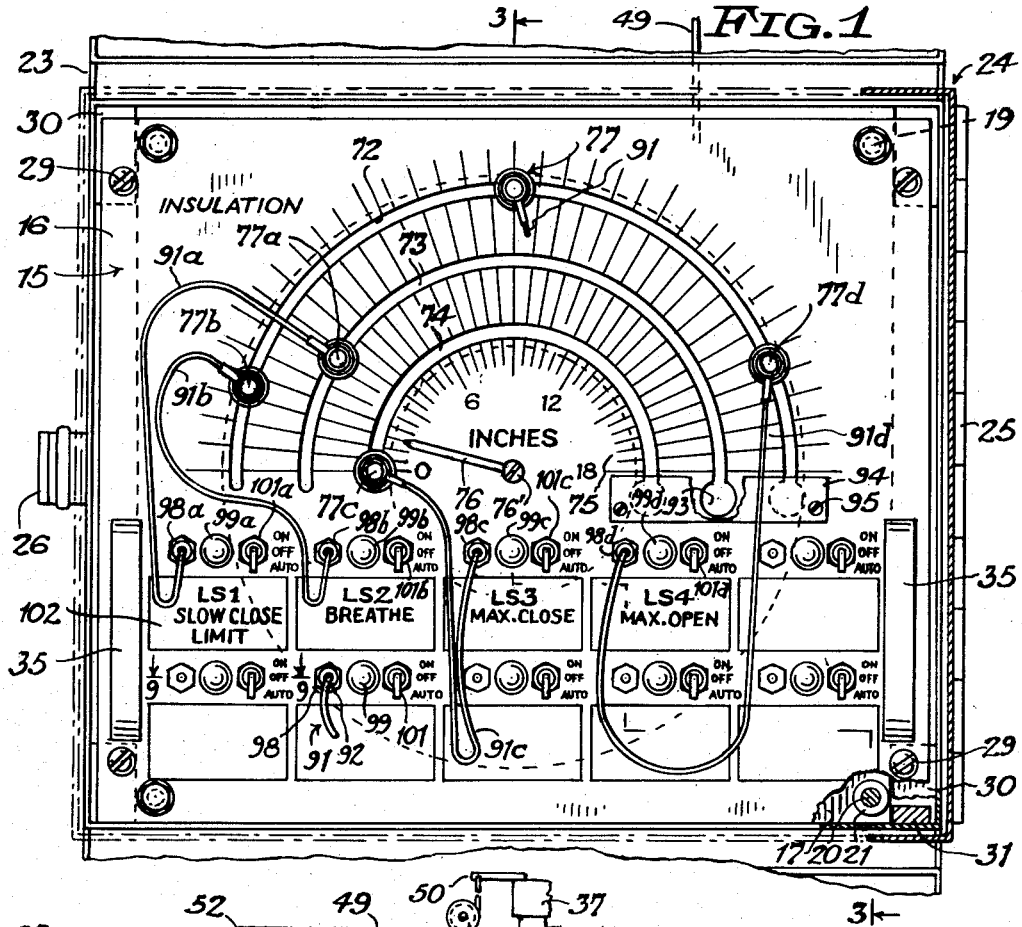
FIG. 1 is a front elevational view of a limit switch apparatus embodying the invention, parts thereof and parts of a cabinet door being shown in section.

In the drawings, 15 designates a controller chassis comprising a vertical rectangular front panel 16, a vertical rectangular inner panel 17, and a vertical rectangular rear panel 18, all formed of insulating material such as Bakelite, these panels being rigidly secured together in spaced parallel relation by nutted corner studs 19 and 20 and tubular spacers 21 and 22 surrounding the studs.

The controller chassis, which is hereinafter more fully described, is detachably housed in a compartment of a sheet metal cabinet 23 the front of which is closed by a swingable marginally flanged door 24 secured thereto at one side by a hinge 25 and at the other side by a hasp or latch 26. The door is provided with a transparent window 27, and has a marginal dust-excluding gasket 28 engageable with the front edge of the cabinet. The corner portions of the front panel are detachably clamped by screws 29 to angle brackets 30 fastened in the cabinet. The inner and rear panels 17 and 18 are narrower than the front panel so as to clear the angle brackets, and the rear panel is of reduced height. Chassis-guiding side bars 31 are fastened in the cabinet along the bottom wall of the cabinet.

The rear chassis panel 18 has secured thereto a centrally disposed multiple-contact plug 32 of any conventional type cooperating with a multiple-contact receptacle 33 rigidly fastened to a vertical rear wall 34 of the cabinet, the plug and receptacle forming an electrical connector to establish various electrical circuits hereinafter described when the chassis is inserted into the cabinet. If desired, the positions of the plug and receptacle may be reversed. The front panel of the chassis is provided near opposite sides with handles 35 to facilitate insertion and removal of the chassis.

Journalled in the front panel 16 and inner panel 17 is a horizontal control shaft 36 extending forwardly through the front panel at right angles thereto, the shaft being rotatable in opposite directions through a maximum angle of about 180°. The shaft 36 is adapted to be operatively connected, as hereinafter described, to a movable operating member of a machine to be controlled. By way of example, this movable machine member is shown to be the reciprocable die-carrying platen 37, FIGS. 2 and 10, of a hydraulically operated compression-type plastic molding press MP hereinafter described, so that different angular positions of the shaft will correspond to predetermined positions of the press platen in its reciprocating travel. A horizontal drive shaft 38 extends parallel to and below the shaft 36 and is journalled in the inner chassis panel 17 and in a bushing 39 secured by a nut 40 to the rear wall 34 of the cabinet. A hubbed gear 41 is detachably fixed to the drive shaft 38 behind the inner panel 17 and meshes with a larger hubbed gear 42 detachably fixed to the control shaft 36. The gear ratio is selected to suit the travel of the movable press platen. The drive shaft 38 is confined against axial movement by the gear 41 and by a collar 43 at the front of the panel 17.

A flanged hub member 44 is detachably fixed to the rear end of the drive shaft 38, as by a set screw 45, and carries a peripherally grooved pulley or drum 46 of suitable diameter.

Figure 2:
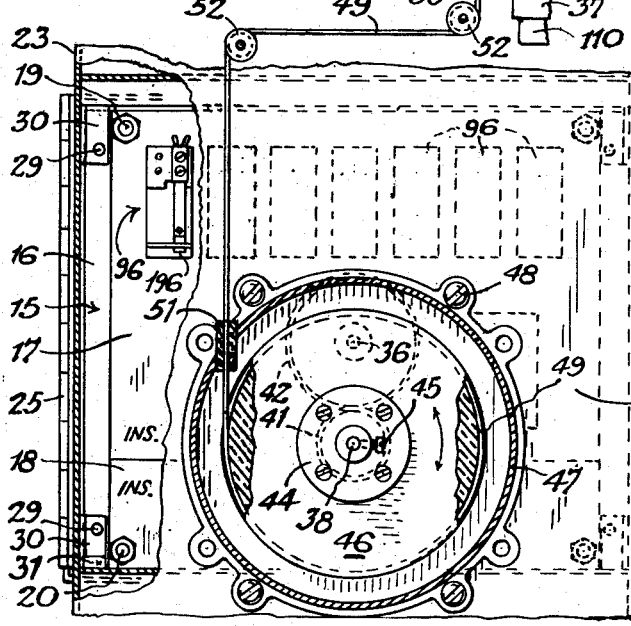
FIG. 2 is a rear view of the apparatus, parts being broken away and parts being shown in section, the view further showing an actuating connection with a molding press platen.

The hubbed pulley is enclosed in a cupped cover member 47 detachably secured to the rear face of the back wall of the cabinet as by screws 48, FIG. 2. A flexible strand 49, such as a length of piano wire, stranded cable or chain, has one end anchored on the pulley 46 and has its other end attached to an arm 50 secured to the movable press platen 37 and projecting laterally therefrom. The wire passes through a felt wiper 51 in the peripheral wall of the cover member 47. The cover member can be mounted in various angular positions on the cabinet back wall to suit the machine installation. In some instances, the flexible wire may pass over idler pulleys 52, as shown. However, in the installation shown, the idler pulleys can be omitted if the wire wound on on the drum 46 is directly connected to the platen arm 50.

Figure 3:
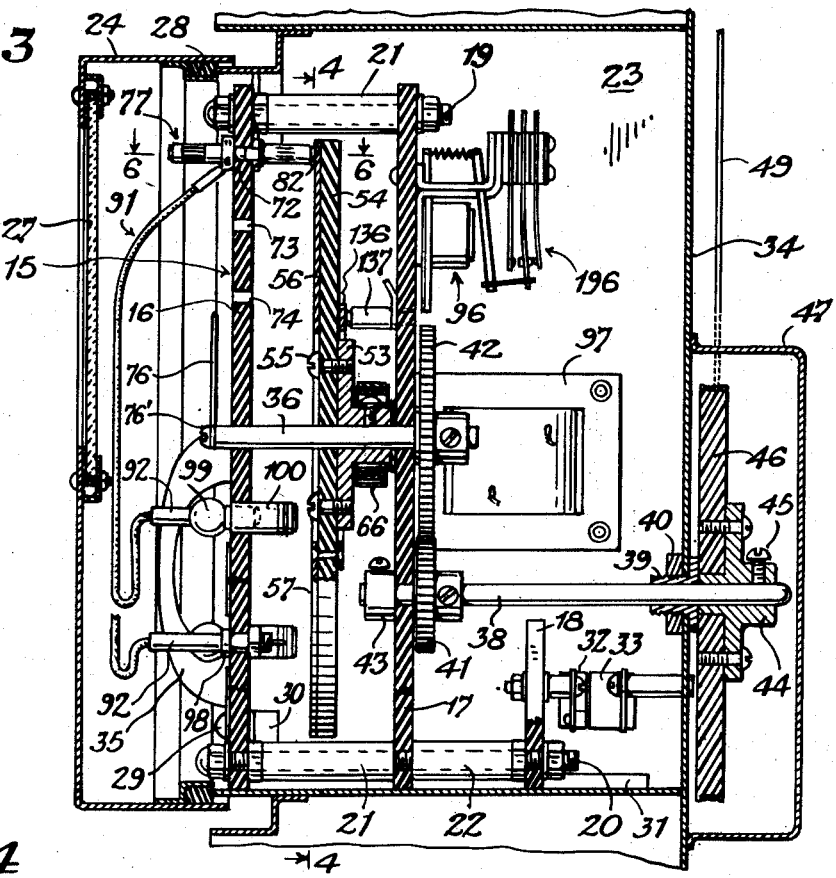
FIG. 3 is a transverse sectional view of the apparatus, taken generally on the line 3—3 of FIG. 1.

At a region between the front panel 16 and inner panel 17 the control shaft 36 has secured thereto a flanged hub 53, FIG. 3, to which an insulating disk 54 is attached by screws 55. A pair of generally semi-circular arcuate metal plates or segments 56 and 57 are secured to the front face of the insulating disk, as by screws 58, to form brush trackways 59, FIG. 4, and have adjacent parallel edges separated by a pair of aligned radially extending insulating bars 60 at opposite sides of the control shaft. Each insulating bar, which is formed of an arc-resisting material such as a melamine plastic, slidably fits in a flat-bottomed groove 61 formed in the disk and is rabbeted at opposite sides to present a central flat-faced rib 62, FIG. 8, which fits between the adjacent parallel edges of the metal segments 56 and 57, the flat front face 63 of the rib being slightly below the front plane of the segments. The segment edges 63' are slightly rounded, and if desired the rear edge portions of the segments may be rabbeted at 64 to engage the rabbeted edges of the insulating bar. Each insulating bar is frictionally held in position and may readily be replaced if necessary. The arcuate segment 56 forms a contact element and is electrically grounded on the control shaft by a conductor 65, FIG. 4, while the segment 57 merely provides extensions of the brush trackways. However, both contact segments may form active switch elements, as hereinafter described. The segments are desirably formed of brass or copper.

Figure 4:
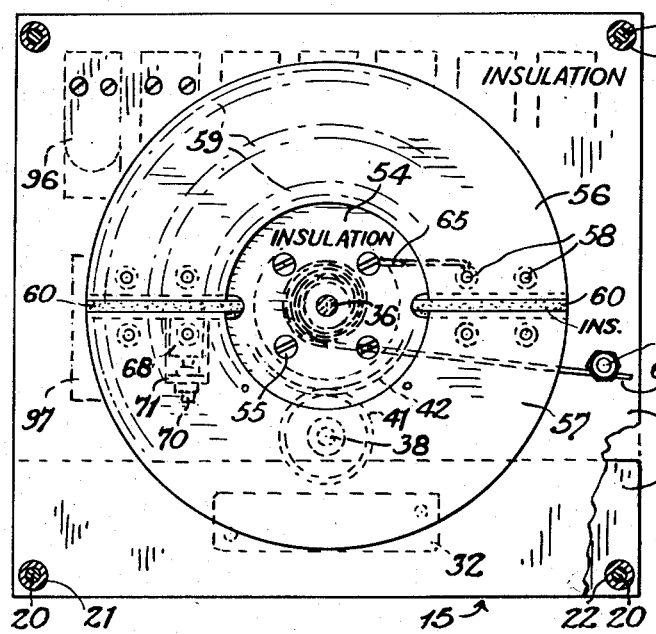
FIG. 4 is a sectional elevational view taken generally on the line 4—4 of FIG. 3.
Figure 5:
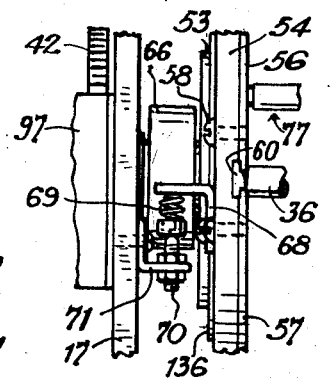
FIG. 5 is a fragmentary detail side elevational view showing resilient stop means for a rotatably mounted contact disk of the apparatus.

The contact carrying disk 54 is positively rotated in one direction by the tensioned drive-transmitting wire 49 and is urged in the other direction by a torsion leaf spring 66 having a spirally coiled portion surrounding the hub member 53, the inner end of the spring being anchored on the hub member, and the outer end of the spring being anchored on a screw 67, FIG. 4, secured to the inner chassis panel 17. The maximum spring-urged rotation of the disk is resiliently limited by suitable stop means here shown to comprise an angle bracket 68, FIG. 5, carried by the disk and engageable with the free end of a coiled stop spring 69 carried on a screw 70 which is adjustably secured to an angle bracket 71 mounted on the inner panel 17. The stop means limits unwinding of the torsion spring in the absence or disconnection of the actuating or driving wire.

The insulating front panel 16 of the controller chassis is provided with three semi-circular slots 72, 73, and 74, concentric with the control shaft 36 and overlying the control disk 54, and is further provided with an arcuate travel scale 75 extending over 180° and adapted to cooperate with a pointer 76 secured to the front end of the control shaft, as by a screw 76'. By way of example, the travel scale 75 is graduated for a range of 18 inches of maximum travel of the press platen or other movable machine member.

A plurality of brush-carrying contact pins or stems, designed generally by the numeral 77, extend through the arcuate panel slots at right angles to the front panel and are secured in adjusted position along the slots to slidably engage the contact segments carried by the disk 54. Each contact stem includes a threaded stud 78, FIG. 6, the rear end portion of which is threaded through a nut 79 and into a knurled metal brush holder sleeve 80, there being a clamping lock washer 81 interposed between the nut and sleeve. A cylindrical brush 82, such as of the copper-graphite type, is slidable in the sleeve 80 and is urged rearwardly against the contact disk by a coiled spring 83 within the sleeve. The diameter of the brush is slightly smaller than the gap between the contact segments of the disk. The nut 79 is of hardened steel and has knurled flat abutment faces 84, FIG. 7, engageable with the rear face of the front panel. The nut 79 is further provided with a key projection 85 slidably fitting in the panel slot to prevent rotation of the stud. The outer portion of the stud carries in succession a knurled nut-forming screw sleeve 86, a lock washer 87, an eye-type terminal 88 and an insulating cup washer 89, the stud having an upset front end 90 to prevent withdrawal of the screw sleeve. By manually tightening the screw sleeve 86, the contact stem will be locked in adjusted position along the panel slot. During tightening and loosening of the screw sleeve, the contact stem is confined against rotation by the key projection 85. The insulating cup washer 89 will prevent metallic contact with a closely adjacent contact pin. A flexible insulated conductor cord 91 is fixed at one end to the contact terminal 88 and the other end is connected to a pin-type plug 92, thus forming a jumper for making selected electrical connections, as hereinafter described. The arcuate panel slots have respective circular end enlargements 93 permitting easy mounting and dismounting of the contact pin assemblies. These slot enlargements are normally covered by an insulating plate 94 detachably secured to the front panel by screws 95.

As hereinafter more fully described, the contact-carrying disk 54, in its forward and reverse travel, cooperates with the brush-carrying contact stems 77 adjustably fixed on the slotted front panel 16 to form circuit-closers controlling various circuits, hereinafter described, as the press platen reaches various positions in its reciprocating travel. These circuits include a number of relays designated generally by the numeral 96, those relays which are active in the system hereinafter described being designated specifically by the numerals 96a, 96b, 96c and 96d. The relays are here shown to be mounted on the rear face of the inner chassis panel 17, and a step-down transformer 97 for energizing the relays is also mounted on this panel. Associated with the respective relays are jacks 98, indicator lamps 99, lamp sockets 100, and three-position selector switches 101 of the toggle type, there being a jack, lamp, lamp socket, and selector switch for each relay and being arranged in groups on the front panel 16 with respective indicia plates 102. The active jacks are designated 98a, 98b, 98c and 98d, the active lamps are designated 99a, 99b, 99c and 99d, the active switches are designated 101a, 101b, 101c and 101d, and the active jumper cords are designated 91a, 91b, 91c and 91d. The jacks 98 are adapted to selectively receive the plugs 92 of the jumper cords, thus forming a switchboard. The indicator lamps 99 are connected in series with the respective relay windings. The toggle switches 101 each have three selective positions, designated "On," "Off," and "Auto," the purpose of these switches being hereinafter described. The indicia plates 102 associated with the several active jacks 98a, 98b, 98c and 98d bear respective identifying legends, namely, "LS1 Slow Close Limit," "LS2 Breathe," "LS3 Max. Close" and "LS4 Max. Open," these legends being appropriate when the apparatus is used in connection with the control of a plastic molding press hereinafter more fully described. The active contact stems 77 forming parts of these limit switches are designated specifically by the numerals 77a, 77b, 77c and 77d.

As shown in the wiring diagram of FIG. 10, the transformer 97 has its primary winding connected to alternating current line conductors 103, 104, preferably rated at 115 volts. The transformer secondary winding supplies current to the relays at a suitable low voltage, such as 24 volts. One terminal of the transformer secondary winding is connected by a bus conductor 105 to one terminal of each of the relay windings. The other secondary terminal is connected by a bus conductor 106 to one terminal of each of the toggle switches 101, and by a conductor 107 to the active contact segment 56 of the contact disk 54. The second terminal of each relay winding is connected to a terminal of the associated indicator lamp 99, and the other terminal of the indicator lamp is connected to the center or common terminal of the associated toggle switch 101. The third terminal of each toggle switch is connected to the associated jack 98. Each jumper cord 91 is connected at its plug end to a selected jack 98, and the other end of the jumper cord is connected to the associated contact stem 77 which is placed at a selected position on the slotted front panel of the apparatus. The toggle switches 101 are normally in "Auto" position to connect the associated jack with the associated relay winding and indicator lamp. When the brush of a contact stem 77 is in engagement with the rotatable contact segment 56 the associated relay winding is energized and the associated indicator lamp is lighted, and when the contact segment rotates out of engagement with the brush, the circuit through the relay winding and lamp is broken. When a toggle switch is in "Off" position, the corresponding relay will not be energized, and when a toggle switch is in "On" position, the relay will be continuously energized regardless of the plugged-in conductor cord.

Each relay 96 includes a single-pole, double-throw switch 196, FIG. 3, which has a normally open contact and a normal closed contact, permitting selective use of these contacts to suit circuit requirements. In FIG. 10, the switches of the active relays are designated by the numerals 196a, 196b, 196c and 196d.

As shown schematically in FIG. 10, the limit switch apparatus is connected in a system including the plastic molding press MP, the system serving to control the molding cycle. The press is here shown to be of the compression type including a lower stationary platen 108 supporting a die or mold section 109, and the vertically movable upper platen 37 carrying a cooperating upper die or mold section 110. A double-acting ram 111 includes an elevated hydraulic cylinder 112 and a downwardly projecting plunger 113 vertically movable therein, the lower end of the plunger carrying the upper platen 37.

The cylinder 112 is supplied with oil from a high pressure supply pipe 114 and is controlled by a four-way three-position valve 115 of conventional type having actuating electromagnets 116 and 117. The supply pipe 114 is connected to the inlet of the control valve, and the upper and lower ends of the cylinder are connected to the valve by respective pipes 118 and 119, the pipe 118 having therein a normally open two-position valve 120 with an actuating electromagnet 121 to close the valve. The valve 120 is shunted by an adjustable flow-controlling throttle valve 122 to limit the rate of downward travel of the plunger when the valve 120 is closed. When the electromagnet 116 of the control valve 115 is energized, oil pressure is applied to the upper side of the ram plunger for advancing the ram to press-closing position, and when the companion electromagnet 117 is selectively energized, oil pressure is applied to the lower side of the ram to lift or retract the ram from closed position. The pipe 119 includes the usual spring-loaded relief or holding valve 123 to prevent gravity descent of the ram plunger. The electromagnet 121 of the valve 120 is energized to close this valve when the downwardly moving upper die approaches its closed position, the oil flow to the upper end of the cylinder being then restricted by the throttle valve 122 so as to provide for slow closing of the press.

Referring to FIG. 10, electric power, such as at 115 volts, is supplied to the control system from the alternating current line conductors 103 and 104, these being connected to the step-down transformer 97, the secondary winding of which is connected to the relay windings, as hereinbefore described. The control system includes suitable series-connected timing switches 124, 125 and 126, the switch 124 being closed during the press cycle, and the switches 125 and 126 being actuated at suitable intervals during the press cycle. Each of the timing switches 125 and 126 is of the single-pole double-throw type with a common or center contact or terminal and with normally open and normally closed contacts. The center contact of the timing switch 125 is connected to the line conductor 103 by a conductor 127 in which the timing switch 124 is interposed. The normally closed contact of the timing switch 125 is connected by a conductor 128 to the center contact of the timing switch 126, and the normally open contact of the timing switch 125 is connected by a conductor 129 to the normally open contact of the relay switch 196b. The normally closed contact of the timing switch 126 is connected by a conductor 130 to the center contact of the relay switch 196b and to the center contact of the relay switch 196d. The normally open contact of the timing switch 126 is connected by a conductor 131 to the center contact of the relay switch 196a and to the center contact of the relay switch 196c.

One terminal of each of the valve electromagnets 116, 117 and 121 is connected by a bus conductor 132 to the line conductor 104. The other terminal of the valve electromagnet 121 is connected by a conductor 133 to the normally open contact of the relay switch 196a. The other terminal of the valve electromagnet 116 is connected by a conductor 134 to the normally closed contact of the relay switch 196c, and the other terminal of the valve electromagnet 117 is connected by a conductor 135 to the normally open contact of the relay switch 196d.

In setting up the limit switch apparatus for use, the cabinet door 24 is open, and the contact pins or stems 77 for the various jumper cords 91, after being inserted into the end enlargements 93 of the front panel slots, are shifted along the slots and are clamped at selected positions along the slots corresponding to the press plunger positions at which controlling functions or events are to take place. The plugs 92 of the jumper cords are inserted into the appropriate panel jacks 98. The selector or toggle switches 101 are then preferably in "Off" position so as to avoid accidental operation of the press. The limit switch LS4, including the contact stem 77d, is set to open at the desired upper position of the plunger, this position being lower than the extreme upper position and being varied to suit the thickness of the dies and the loading space required. The limit switch LS3, including the contact stem 77c, is set to open at the desired safe lower position of the plunger, this position being lower than the plunger position when the dies are closed but higher than the extreme lower position of the plunger. The limit switch LS3 is intended to operate only in the absence of either die or both dies. The limit switch LS1, including the contact stem 77a, is set to operate when the upper die approaches its closed position so as to slow down the plunger during the closing travel of the press. The limit switch LS2, including the contact stem 77b, is set to operate when the upper die rises about 1/16 inch from its closed position, for the breathing or degassing operation. If the selector switch 101a is in its "On" position, the relay switch 196a will remain closed, thus energizing the valve electromagnet 121 and thereby permitting only a slow downward travel of the press plunger. If the selector switch 101c is in its "On" position, the valve electromagnet 116 will remain deenergized, thus preventing any downward travel of the press plunger. The several selector switches 101 are manually actuated to their "Auto" positions when normal operation of the press is desired.

When the press is ready for a cycle of operation, the movable upper die 110 secured to the plunger 113 is in its upwardly retracted position. The operator then places one or more slugs of molding material in the die cavity of the lower die 109. In some instances these slugs may have been preheated, as by a high-frequency electric preheater. At this time, the limit switch relays 96 are all deenergized since all the associated contact stem brushes 82 are off the active contact disk segment 56.

The operator then starts the timing means, which closes the timing switch 124, this switch remaining closed during the press cycle. The timing switch 126 is set to be actuated at this time or immediately thereafter, closing a circuit through the valve electromagnet 116 to energize this electromagnet and thus actuate the valve 115 to admit oil above the plunger and thereby move the plunger on its press-closing travel. This circuit extends from the line conductor 103, through the conductor 127 and closed timing switch 124, the unactuated timing switch 125, the conductor 128 the actuated timing switch 126, the conductor 131, the unactuated relay switch 196c, the conductor 134, the valve electromagnet 116, and the bus conductor 132 to the line conductor 104. During the downward travel of the plunger, the contact disk 54 rotates counterclockwise, as viewed in FIG. 10, under the action of the torsion spring 66 and the restraint of the wire 49. During the initial travel of the contact disk, the rotating contact disk segment 56 engages the contact stem 77d on the jumper cord 91d, thus energizing the relay 96d and actuating the associated relay switch 196d to closed position. However, no circuit is established through the relay switch 196d at this time since the circuit is interrupted at other points. As the press plunger approaches its lower position, the contact stem 77a on the jumper cord 91a engages the rotating contact disk segment 56, thus energizing the relay 96a and closing its switch section 196a to establish a circuit through the valve-closing electromagnet 121 of the valve 120, so as to slow down the closing of the press. This circuit extends from the line conductor 103, through the conductor 127 and closed timing switch 124, the unactuated timing switch 125, the actuated timing switch 126, the conductor 131, the closed relay switch 196a, the conductor 133, the valve electromagnet 121, and the bus conductor 132 to the line conductor 104. The press then closes under the pressure of the oil above the plunger to cause the molding material to fill the mold cavity and to hold the molded article under pressure with the dies closed. When the upper die on its closing travel reaches a point about 1/16 inch from closed position the contact stem 77b for the jumper cord 98b engages the rotating contact disk segment 56, thus closing a circuit energizing the relay 96b and actuating the switch 196b thereof to closed position. However, at this time no circuit is established through the switch 196b. After a suitable period, the timing switch 125 is actuated to initiate a breathing or degassing operation. The actuation of the timing switch 125 opens the circuit through the actuated timing switch 126 to deenergize the valve electromagnets 116 and 121, thus releasing the oil pressure from the upper side of the press plunger. At the same time a circuit is established through the press-opening valve electromagnet 117 to admit oil below the plunger and thereby raise the plunger a short distance, permitting escape of gas. This circuit extends from the line conductor 103, through the conductor 127 and its actuated timing switch 124, the actuated timing switch 125, the conductor 129, the actuated closed relay switch 196b, the conductor 130, the actuated closed relay switch 196d, the conductor 135, the valve electromagnet 117, and the conductor 132 to the line conductor 104. After the upper die rises about 1/16 inch, the reversely rotating contact disk segment 56 rides off the contact stem 77b on the jumper cord 98b, thus deenergizing the relay 96b and thereby opening the circuit through the valve electromagnet 117 to terminate the lifting travel of the press plunger. The press remains in this slightly open position for a suitable interval terminated by deactuation of the timing switch 125, whereupon the valve electromagnets 116 and 120 are reenergized to effect a slow closing of the press. If desired, the timing switch 125 may be actuated two or more times for effecting a plurality of successive breathing or degassing operations. After a suitable article-curing period, the timing switch 126 is deactuated to open the circuit through the press-closing valve electromagnets 116 and 121, and to close a circuit through the valve electromagnet 117 for opening the press. The latter circuit extends from the line conductor 103, through the conductor 127 and its actuated timer switch 124, the deactuated timing switch 125, the conductor 128, the deactuated timing switch 126, the conductor 130, the actuated relay switch 196d, the conductor 135, the valve electromagnet 117, and the bus conductor 132 to the line conductor 104. The plunger-retracting operation continues until the reversely rotating contact disk segment 56 rides off the contact stem 77d on the jumper cord 91d, thus deenergizing the relay 96d and opening the switch 196d thereof to interrupt the circuit through the valve electromagnet 117. The timer switch 124 then opens to terminate the cycle, and the molded article is removed from the press. The press is then ready for the next cycle. In some instances, the timing switch 124 may be reclosed automatically after a short interval to start the next cycle.

In a modified method of operating the press, the rising platen of the opening press is arranged to strike or bump against a rigid stop, such as the lower end of the cylinder 112, or an added stop member, to dislodge a molded article adhering to the upper die. In this case the "Max. Open" limit switch LS4 (which includes the contact stem 77d) is set to open at this point.

If the limit switch unit should require maintenance, it can be quickly removed from the cabinet and be replaced by an identically arranged spare unit, this minimizing interruption of press service.

With the limit switch apparatus of the invention, all the limit stop adjustments can be easily, conveniently and safely made at one station. The apparatus requires only a single driving or actuating element for connection to the movable member of the press or other machine, and this driving element is preferably flexible and can be readily guided in various directions and paths of travel. The torsion return spring 66 takes up backlash in the gearing and other drive transmitting parts.

The limit switch unit has a wide range of set-up adjustments to meet different operating conditions, and can be connected in various control circuits to suit different types of presses. The supporting means for the adjustably positioned contact elements will not only accommodate a large number of these elements in a relatively small space, but will also permit closely spaced switching operations to be effected.

While the limit switch apparatus is here shown to be used in the control system of a plastic molding press, it can also be used in connection with various other machines having movable operating members, such for example as machine tools equipped with tool carriages movable back and forth over a range of translatory, oscillatory or rotary travel. Instead of a direct mechanical connection between the limit switch unit and the movable operating member of the machine, it is possible to provide an indirect connection, as by means of a servo-motor.

As hereinbefore noted, the flat front face 63 of the insulating bar 60 is depressed slightly below the front plane of the contact segments 56 and 57. This depression, which may be of the order of 0.002 inch, serves to insure relatively accurate operation of the limit switch sections with respect to the angular position of the contact disk 54. The slidable brush 82 may tend to tilt very slightly in its holder sleeve 80, presenting a heel or edge of the brush in engagement with the contact disk. For example, in FIG. 8, if the contact segment 57 is rising to circuit-closing position with respect to the brush, the heel of the slightly tilted brush will be at the lower side of the brush and will initially engage the rounded edge 63' of the contact segment 57 at a definite angular position of the contact disk.

In order to permit use of the limit switch unit with various types of control circuits, such as self-aligning, follow-up, or positioning circuits, provision is made for making electric connections to both of the diametrically opposed contact segments 56 and 57 on the rotatable disk. The contact segment 56 is connected by the return spring 66 to the panel screw 67, as hereinbefore described, while the contact segment 57 is connected to a slip ring 136, FIG. 3, on the back of the insulating disk 54, the slip ring being engaged by a terminal-carrying brush assembly 137 supported by the insulating panel 17.

I claim:

1. In a limit switch apparatus, a rotatably mounted circuit-controlling member including a disk angularly movable back and forth in a range of travel through a plurality of circuit-closing positions, said disk having a face comprising a pair of opposed coplanar electrically conductive plates each extending over nearly 180° and further having diametrically extending insulating strips between the adjacent edges of said plates, said plates being insulated from each other, said disk face forming thereon a plurality of concentric brush trackways, a panel extending perpendicular to the rotational axis of said disk and spaced axially from said trackways, said panel having a plurality of concentric arcuate slots aligned with said trackways, a plurality of contact devices extending through said panel slots and carrying respective spring-pressed flat-ended contact brushes bearing on said trackways to form circuit-closers therewith, said contact devices being independently adjustable along said slots through a continuously variable range of selected positions to vary the operating points of said circuit-closers in the range of angular displacement of said disk, the brush-engaging portions of said insulating strips being wider than said brushes to prevent bridging of the adjacent edge portions of said plates by said brushes.

2. An apparatus in accordance with claim 1, wherein the disk has radial channels in which the insulating strips are slidably fitted, and said channels being open at their outer ends to permit insertion and removal of said strips.

3. In a limit switch apparatus, a circuit-controlling member movable back and forth in a range of travel through a plurality of circuit-controlling positions, driving means for moving said member in opposite directions and adapted to cooperate with a forwardly and reversely movable machine element for effecting displacement of said member in proportion to the displacement of said machine element, a plurality of circuit-closers operable by said circuit-controlling member during the travel of said member, said circuit-closers being independently adjustable to vary their operating points in the range of travel of said member, an electrical power source, a plurality of electromagnetic devices adapted to be energized from said power source for controlling the displacement of said machine element, and a plurality of selector switches each having an open position and first and second closed positions, said electromagnetic devices being connected in circuit with the respective selector switches and with the respective circuit-closers, each selector switch in its first closed position connecting the corresponding electromagnetic device to said power source for continuous energization of said device, each switch in its second closed position connecting said electromagnetic device to said power source through the associated circuit-closer, and each switch in its open position preventing energization of the associated electromagnetic device by the associated circuit-closer.

4. In a limit switch apparatus, a circuit-controlling member movable back and forth in a range of travel through a plurality of circuit-controlling positions, driving means for moving said circuit-controlling member in opposite directions and adapted to cooperate with a forwardly and reversely movable machine element for effecting displacement of said circuit-controlling member in proportion to the displacement of the machine element, a plurality of circuit-closers operable by said circuit-controlling member during the displacement of said member, said circuit-closers being independently adjustable to vary their operating points in the range of travel of said circuit-controlling member, and an electric power source, and a plurality of relays having their windings connected in circuit with said power source and the respective circuit-closers to be energized upon the closing of said circuit-closers, said relays having switches adapted to control actuating circuits for said machine element.

References Cited in the file of this patent

UNITED STATES PATENTS

| 1,268,348 | Harris | June 4, 1918 |
| 2,178,112 | Barker | Oct. 31, 1939 |
| 2,267,102 | Huggins | Dec. 23, 1941 |
| 2,345,928 | Foster | Apr. 4, 1944 |
| 2,466,072 | Barcheller | Apr. 5, 1949 |
| 2,592,770 | Waldie | Apr. 15, 1952 |
| 2,784,266 | Krahulec | Mar. 5, 1957 |